Jan. 11, 1966     W. LEE LOCKERBY     3,228,206
FOOD FREEZING APPARATUS
Filed Feb. 24, 1964     2 Sheets-Sheet 1
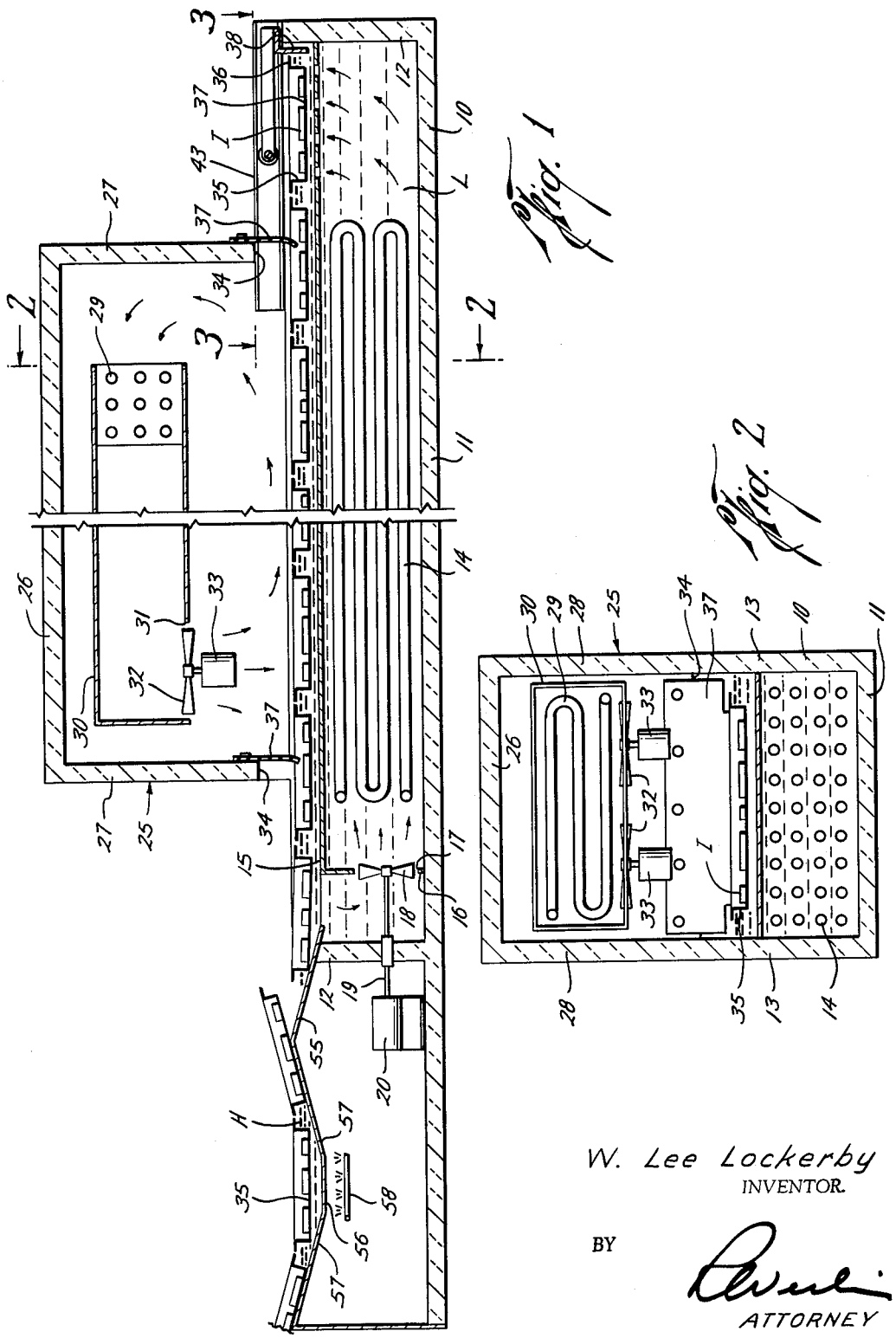
W. Lee Lockerby
INVENTOR.
BY
ATTORNEY

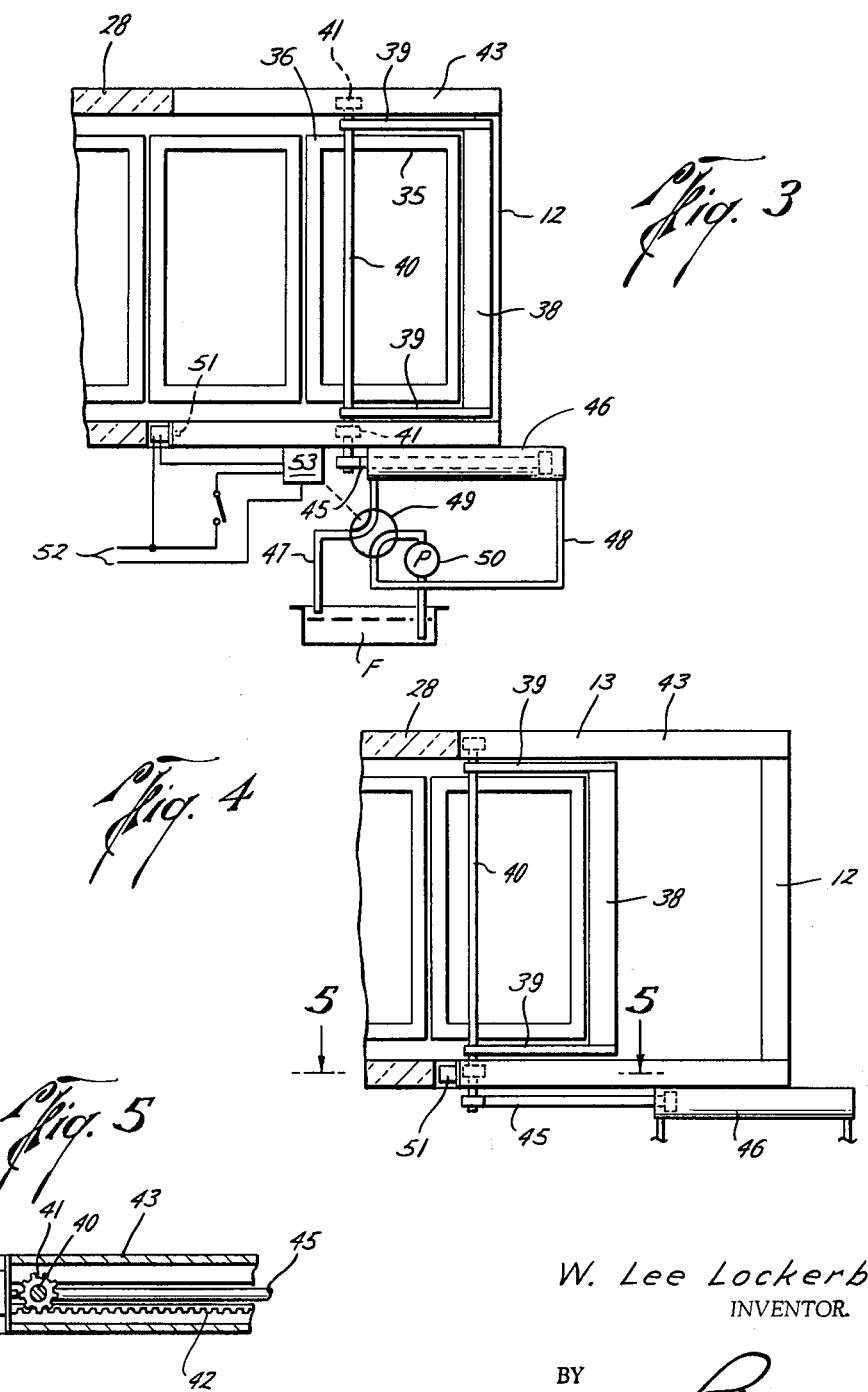

United States Patent Office 3,228,206
Patented Jan. 11, 1966

3,228,206
FOOD FREEZING APPARATUS
W. Lee Lockerby, 6624 Longview, Houston 20, Tex.
Filed Feb. 24, 1964, Ser. No. 346,777
10 Claims. (Cl. 62—322)

This invention relates to food freezing apparatus and more particularly to a form of a continuous freezing apparatus for freezing individual food items in a manner commonly referred in the industry as "individual quick frozen" (I.Q.F.) products.

In the frozen food industry a recent practice, particularly in the freezing of sea food items such as shrimp, scallops and fish sticks, is to freeze these items in individual form so that they may be packed as free individual items, that is, not frozen together in a mass. It is this type of freezing which is referred to as "I.Q.F." in the industry.

Conventional I.Q.F. systems generally employ a slow hand operated procedure which is rather inefficient and expensive. Generally the food items to be frozen are placed in trays of suitable shape, the items being carefully separated from one another so as to be out of contact during the freezing, and the trays are placed in racks which are then moved into a freezing chamber where the product is subjected to a cold air blast chilled to a sufficiently low temperature to effect the desired rapid deep freezing. Such conventional systems, in addition to being slow, cumbersome and generally inefficient, cause high moisture losses by evaporation into the cold air stream with consequent losses in quality and in weight of the product. Also, because of the large amount of manual operations involved, it is difficult to maintain the individual food items out of contact with one another which is essential in order to prevent the items from freezing together during the processing.

The present invention, therefore, has for its primary object the provision of an improved form of continuous freezing system particularly adapted for I.Q.F. processing, which obviates the disadvantages of more conventional systems.

An important object is the provision of a freezing apparatus in which the food articles to be frozen are subjected to a combination of chilling by both liquid and gaseous refrigerants, which assures rapid deep freezing without displacement or disturbance of the individual food items, thereby enabling the items to be produced in individual frozen form for packaging in the desired loose manner.

In acordance with a preferred embodiment of this invention, the apparatus provides a combination of so-called "contact" freezing and "blast" freezing. This is accomplished by placing the trays containing the food items in a liquid refrigerant whereby the items are substantially instantaneously frozen in place to the bottoms of the pans or trays. Thereafter, the transfer of the cold into the food items is continued as the trays move in a partly submerged condition through the liquid refrigerant into an enclosure where the food items are simultaneously subjected to a blast of cold gaseous refrigerant, generally air. This combination of contact and air-blast freezing results in the application of freezing temperatures to all portions of the products simultaneously, thereby assuring quicker and deeper freezing and this, in turn, results in the formation of extremely small ice crystals in the product. The consequence of this kind of quick low-temperature freezing is that the product will maintain its deep frozen consistency even when subjected to mis-handling or thermal shock and protects the quality of the product to the maximum extent. Moreover, by employing the combination freezing arrangement and by selectively directing the vaporous refrigerant on the product in the latter stages of its movement through the freezing path, the evaporation of moisture with resulting product shrinkage may be effectively controlled to reduce it to a minimum. The reduction in loss of moisture is also aided by the initial contact chilling of the product before it enters the dual freezing area of the refrigeration system.

As a further step in the processing of the food being frozen in accordance with the system of this invention, the trays containing the frozen products leaving the refrigeration zone may be floated through a body of heated water at a rate which serves to only effect quick release of the food items from their adhesion to the bottoms of the trays, without causing any significant increase in the temperature of the items themselves. This serves to release the frozen food items from the trays so that they can be spilled from the trays into suitable packaging containers without adhesion of the individual items to each other.

Other and more specific objects and advantages of this invention will become more readily apparent from the following detailed description when read in conjunction with the accompanying drawing which illustrates a useful embodiment in accordance with this invention.

In the drawing:

FIG. 1 is a longitudinal, sectional elevation, generally diagrammatic, of a freezing apparatus in accordance with this invention;

FIG. 2 is a vertical, cross-sectional view taken generally along line 2—2 of FIG. 1;

FIG. 3 is a fragmentary plan view also partly diagrammatic, taken generally along line 3—3 of FIG. 1, showing the position and arrangement of the parts employed for moving the trays of food through the refrigerator zone;

FIG. 4 is a view similar to FIG. 3, showing another position of the conventional conveyor or pusher apparatus; and FIG. 5 is a fragmentary sectional view taken along line 5—5 of FIG. 4.

Referring to the drawing, there is shown an elongate, generally rectangular tank, designated generally by the numeral 10, having a bottom 11, end walls 12—12, and side walls 13—13. Tank 10 is adapted to contain a body of liquid refrigerant L, of any suitable type, e.g., generally conventional brine solution, which is chilled to the desired sub-freezing temperature by means of a conventional chilling means, such as expanded ammonia, the expanding gas passing through coils 14 submerged in the body of refrigerant L. A horizontally disposed perforate baffle plate 15 is mounted in the upper portion of tank 10 a short distance below the top edge thereof and terminates a short distance from one end of tank 10, in this instance, the left-hand end, which, for purposes of this description, will be termed the discharge end and the other end being referred to herein as the inlet end. A vertically disposed plate 16 having a circular opening 17 therein extends from the discharge end of baffle 15 to the bottom 11 of the tank and a propeller 18 is mounted in opening 17 and connected, by means of a shaft 19 extending through end wall 12, to a motor 20 which drives the propeller 18 in order to circulate the liquid refrigerant L through the tank generally in the direction indicated by the arrows in FIG. 1. The liquid refrigerant is thus circulated generally longitudinally from the discharge end toward the inlet end and through the openings in baffle plate 15 into and through the relatively shallow layer of liquid refrigerant extending above baffle plate 15.

A portion of the upper end of tank 10 is enclosed by an upwardly extending generally rectangular housing, designated generally by the numeral 25, the length of which is made somewhat less than that of tank 10 and positioned thereon so that its ends are substantially equidistant from the ends of tank 10, thereby providing at each end of tank 10 an open surface portion for purposes which will appear subsequently. Housing 25 includes a closed top 26, end walls 27—27, and side walls 28—28 which may be extensions of side walls 13—13 of tank 10. The bottom of housing 25 is in open communication through its entire length with the portion of the upper end of tank 10, which is enclosed within housing 25. A set of refrigerator coils 29 is disposed in the space enclosed by housing 25 and may be mounted in one end of a duct 30 having an opening 31 in its lower wall spaced from coils 29. The latter may be located at the forward or inlet end of housing 25, while opening 31 preferably will be located adjacent the rearward or discharge end of housing 25. A fan 32, driven by a motor 33, is mounted in opening 31 and arranged to direct a circulation of air over coils 29 thence through opening 31 downwardly toward the surface of the refrigerant liquid in tank 10, the general direction of circulation of the air being indicated by the arrows inside housing 25. End walls 27 are each provided with an opening 34 extending across the width of housing 25 and tank 10 to allow passage through the housing of trays 35 containing food items I. Openings 34 may be closed by means of flexible curtains 37, the ends of which brush the tops of trays 35 as they pass therethrough and serve as seals which will effectively retain to a maximum extent the gaseous freezing medium inside housing 25 as the trays move therethrough.

Trays 35 are preferably of shallow rectangular form, as illustrated, each having a flanged rim 36 about its upper end and a generally flat bottom 37. These trays may be of any suitable metallic or non-metallic material but will normally be constructed of stainless steel and when loaded with food items, will be sufficiently buoyant to float in partially submerged condition in the upper layer of refrigerant L which is above baffle plate 15. Flanged rim 36 serves as means to support the trays on guide rails or the like disposed along the sides of the tank where such guides may be provided, although the buoyancy of the trays will generally be sufficient to support them at the proper depth in the liquid refrigerant.

The trays may be moved through the surface layers of the liquid refrigerant by any suitable and known means. A suitable means is illustrated in the drawing and comprises a pusher bar 38, which may be of the angle form shown, extends transversely of tank 10 adjacent the inlet end. Pusher bar 38 is secured at its ends to a pair of forwardly extending arms 39—39 positioned at opposite sides of the tank and just outside the side edges of trays 35, as best seen in FIGS. 3 and 4. The forward ends of arms 39 are connected to a crosshead 40, the opposite ends of which rotatably mount pinions 41—41 which mesh with longitudinal racks 42 (FIG. 5) mounted in side channels 43 positioned on top of side walls 13 at the inlet end of the tank. This rack-and-pinion arrangement serves to guide the pusher bar smoothly and evenly in its longitudinal movements. When a series of trays 35 are positioned in the top of tank 10 in a number sufficient, when in end-abutting relation, to extend from one end of the tank to the other, it will be seen that forward movement of pusher bar 38 bearing against the rearmost one of the trays in the series, will serve to push all of the trays forwardly for a distance corresponding to the stroke of the arms 39. This stroke will be regulated so that the pusher bar will move a distance corresponding to the longitudinal dimension of one of the trays and then retract to its initial position. Pusher bar 38 may be reciprocated in any suitable and generally conventional manner. One arrangement for effecting such movement, best illustrated in FIGS. 3 and 4, comprises a hydraulic fluid-actuated plunger 45 mounted in a cylinder 46 the opposite ends of which are connected in the conventional manner to a source of hydraulic fluid F by means of conduits 47 and 48 having common communication with a conventional four-way valve 49. A pump 50, of any conventional design, is disposed in the conduit system for supplying hydraulic fluid pressure to the opposite ends of cylinder 45 in accordance with the position of valve 49 in order to cause reciprocating movement of pusher bar 38 first in the forward direction for moving the trays forwardly through tank 10, and then to return to its initial position preparatory to engaging a tray which will be inserted into the tray series as the new rearmost tray. The return movement of the pusher bar may be accomplished automatically by causing an element carried by crosshead 40 to strike a switch 51 mounted in the path of movement of the crosshead and connected into a conventional electrical circuit 52 which includes a solenoid element 53 which actuates valve 49 in response to actuation of switch 51.

The operation of the device it is thought will be clear from the foregoing description. It will be seen that freezing of individual food items is accomplished by the apparatus in the following manner: Food items I will have been placed in the trays 35 and arranged therein so that the individual items are out of contact with each other. The trays will then be set into the surface of the liquid refrigerant at the open inlet end of tank 10. It will be understood that in the beginning of the operation a sufficient number of trays 35 will thus be successively placed in the top of tank 10 to form a continuous train thereof in end-abutting relation. It will be evident that as one tray is placed in the refrigerant and moved forward, the next tray can be put in behind the preceding tray and can be pushed forward to provide room for the next succeeding tray. Thereafter, the tray pushing means is put in operation and as pusher bar 38 moves forwardly through its stroke, another tray containing the food items is put in place in the rearmost position in the forwardly moving train and this is repeated as rapidly as determined by the pre-set timing of the system, to assure continuous movement of the food items at the desired speed through the refrigerating apparatus. Baffle plate 15 also serves to limit the extent of submergence of the trays in the refrigerant to prevent spill-over into the trays.

When the rearmost tray is first put into the liquid refrigerant at the inlet end of tank 10, sufficient transfer of cold will occur through the bottom of the tray into the contacting layer of the food items to quick freeze the moisture therein and cause these items to instantly adhere firmly to the tray bottom. This will cause the food items to remain fixed in their separated positions as the trays move through the refrigerating apparatus and they will not, therefore, be displaced even by brushing contact with the lower ends of seal curtains 37. The transfer of the low temperature from the liquid refrigerant to the food items will continue as the trays move forward through the liquid refrigerant and will, of course, increase the extent of freezing of the food items as the trays move along through the housing 25. In passage through the latter, the food items will be subjected both to the cold transferred from the liquid refrigerant and from the direct contact with the gaseous refrigerant circulated inside housing 25. The combination of both types of refrigeration will result in quick, deep and complete freezing of these items to the desired temperature. By directing the gaseous refrigerant against the food items, as the latter attain or approach the discharge portion of housing 25, the food items will be subjected to contact by the gaseous refrigerant in a limited manner such as to minimize the evaporation of moisture from the food items. Moreover, by the time the food items attain a position adjacent the discharge end of housing 25, the items will have been sufficiently deeply frozen to prevent the loss of additional moisture therefrom when subjected to the direct blast of cold gaseous refrigerant being delivered by fans 32.

Release of the frozen food items from the trays may be accomplished in the following manner: As the trays containing the frozen food items pass out of housing 25, they are urged out of the discharge end of tank 10 up an upwardly inclined plate 55 and thence into a shallow body of liquid H, such as water, contained in a narrow tank 56 having inclined walls 57—57. The length of tank 56 is made only slightly greater than the length of a tray 35 so that the latter remains in contact with liquid H for just the amount of time required to move the tray across the surface of liquid H, this time also being determined by the stroke of pusher bar 38. Liquid H will be heated in any suitable manner, as indicated by the burners 58, to any suitable temperature such that during the short period of time in which the tray is resident in liquid H only enough heat will transfer through the tray bottoms to melt the immediately adjacent ice layer which causes adhesion of the food items to the bottom of the tray. This is accomplished very quickly and without transfer of any appreciable heat to the frozen food items, but leaves them in individual solidly frozen form, so that when the tray containing them is pushed out of tank 56, the food items will be loose in the tray and will not, because of their deeply frozen condition, adhere to one another. They can then be discharged in individually loose form into any appropriate package means.

It will be understood that the individual elements of the freezing apparatus heretofore described, may be of any conventional form or arrangement, since their particular details do not form a part of the invention which is directed to the system as a whole.

For example, instead of employing a refrigerating coil immersed in a body of liquid in tank 10, the refrigeration of the liquid can be accomplished externally of the tank and pumped through the tank. A similar arrangement may be employed for providing the gaseous refrigerant in housing 25 as such refrigerant can be delivered into the housing from external sources. Moreover, instead of air as the gaseous refrigerant, it will be understood that other refrigerant gases, particularly nitrogen, may be employed for this purpose.

It will be obvious that the pusher or conveyor means for moving the trays through the refrigerating zones may take many forms which will be readily evident to those skilled in the art.

It will be further understood that numerous modifications and alternations may be made in the details of the illustrative embodiment within the scope of the appended claims but without departing from the spirit of this invention.

What I claim and desire to secure by Letters Patent is:

1. A food refrigerating apparatus, comprising, a tank containing a body of a liquid refrigerant, means for circulating said liquid refrigerant through said tank, a plurality of open topped trays containing food articles flotationally disposed in sequential abutting relation in the surface of said liquid refrigerant in freezing relation thereto, means for moving said trays through said tank, a hollow housing positioned over said tank to enclose a portion of the path of movement of said trays through said tank, and means in said housing for circulating a gaseous refrigerant into the interiors of said trays into direct refrigerating contact with the food articles in said trays as the latter move through said housing, and means disposed adjacent the discharge end of said tank to heat the bottoms of said trays to release said food articles from frozen adhesion to said trays.

2. A food refrigerating apparatus, comprising, a tank containing a body of a liquid refrigerant, a plurality of open topped trays containing food articles flotationally disposed in sequential abutting relation in the surface of said liquid refrigerant in freezing relation thereto, means for moving said trays through said tank, a hollow housing positioned over said tank to enclose a portion of the path of movement of said trays through said tank, and means in said housing for circulating a gaseous refrigerant into the interiors of said trays into direct refrigerating contact with the food articles in said trays as the latter move through said housing, openings in the opposite ends of said housing for entrance and exit of said trays, and flexible curtain means covering said openings adapted to seal said openings against loss of gaseous refrigerant while permitting passage therethrough of said trays.

3. A food refrigerating apparatus, comprising, a tank containing a body of a liquid refrigerant, means for circulating said liquid refrigerant within said tank, a plurality of open topped trays containing food articles flotationally disposed in sequential abutting relation in the surface of said liquid refrigerant in freezing relation thereto, means for moving said trays through said tank, a perforate baffle plate horizontally disposed in the tank at a position to limit submergence of said trays in said liquid refrigerant, a hollow housing positioned over said tank to enclose a portion of the path of movement of said trays through said tank, and means in said housing for circulating a gaseous refrigerant into the interiors of said trays into direct refrigerating contact with the food articles in said trays as the latter move through said housing.

4. A food refrigerating apparatus, comprising, a tank containing a body of a liquid refrigerant, means for circulating said liquid refrigerant through said tank, a plurality of open topped trays containing food articles flotationally disposed in sequential abutting relation in the surface of said liquid refrigerant in freezing relation thereto, means for moving said trays through said tank, a hollow housing positioned over said tank to enclose a portion of the path of movement of said trays through said tank, and means in said housing for circulating a gaseous refrigerant into the interiors of said trays into direct refrigerating contact with the food articles in said trays as the latter move through said housing.

5. A food refrigerating apparatus comprising, a generally rectangular tank containing a body of a liquid refrigerant, means for circulating said liquid refrigerant through said tank, a train comprised of a plurality of open-topped generally rectangular trays containing food articles flotationally disposed in sequential end-abutting relation in the surface of said liquid refrigerant in freezing relation thereto, longitudinally reciprocable pusher means alternately engageable with and retractable from the rearmost one of the trays in said train, the longitudinal stroke of said pusher means being operable to alternately move the entire train forwardly through said tank a distance corresponding to substantially the length of one tray and to be retracted a corresponding distance to admit another tray into the train, a hollow housing positioned over said tank to enclose a portion of the path of movement of said trays through said tank, and means in said housing for circulating a gaseous refrigerant into the interiors of said trays into direct refrigerating contact with the food articles in the trays as the latter move through said housing.

6. An apparatus according to claim 5 wherein each of said trays carries laterally extending side flanges arranged to overhang the upper ends of the side walls of said tank.

7. An apparatus according to claim 5 including a perforate baffle plate horizontally disposed in the tank at a position to limit submergence of said trays in said liquid refrigerant to a depth less than that of said trays.

8. An apparatus according to claim 5 wherein said pusher means comprises a pusher bar disposed transversely of the rearward end of said tank, and rack-and-pinion means arranged between the pusher bar and the side walls of the tank to guide the pusher bar longitudinally of the tank.

9. An apparatus according to claim 8 including power-operated reciprocating means drivingly connected to said pusher bar.

10. An apparatus according to claim 9 including switch means responsive to predetermined forward movement of said pusher bar to automatically actuate said reciprocating means to return the pusher bar to its initial rearward position.

References Cited by the Examiner

UNITED STATES PATENTS

| | | | |
|---|---|---|---|
| 1,822,718 | 9/1931 | Vucassovich | 62—375 X |
| 1,939,334 | 12/1933 | Burke | 62—374 X |
| 2,162,213 | 6/1939 | Conn | 62—374 X |
| 2,213,206 | 9/1940 | Culver | 62—374 |
| 2,282,899 | 5/1942 | Snader | 62—375 |
| 2,669,852 | 2/1954 | Nauroth | 62—376 |
| 2,974,497 | 3/1961 | Carpenter et al. | 62—63 |

EDWARD J. MICHAEL, *Primary Examiner.*